United States Patent
Egorov (10) Patent No.: US 9,781,161 B2
(45) Date of Patent: *Oct. 3, 2017

(54) NETWORK DEVICES USING TLS TICKETS FOR SESSION PERSISTENCE

(71) Applicant: Avi Networks, Santa Clara, CA (US)

(72) Inventor: Vadim Egorov, Palo Alto, CA (US)

(73) Assignee: Avi Networks, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,573

(22) Filed: Jan. 25, 2017

(65) Prior Publication Data

US 2017/0134424 A1 May 11, 2017

Related U.S. Application Data

(63) Continuation of application No. 14/173,597, filed on Feb. 5, 2014, now Pat. No. 9,591,084.

(60) Provisional application No. 61/904,395, filed on Nov. 14, 2013.

(51) Int. Cl.
*H04L 29/08* (2006.01)
*H04L 29/06* (2006.01)

(52) U.S. Cl.
CPC ........ *H04L 63/166* (2013.01); *H04L 63/0281* (2013.01); *H04L 63/0807* (2013.01); *H04L 67/1002* (2013.01); *H04L 67/1027* (2013.01); *H04L 67/146* (2013.01)

(58) Field of Classification Search
CPC  H04L 67/1027; H04L 63/166; H04L 67/1002
See application file for complete search history.

(56) References Cited

U.S. PATENT DOCUMENTS

| | | | | |
|---|---|---|---|---|
| 9,124,629 | B1* | 9/2015 | Bowen | H04L 63/168 |
| 2003/0219020 | A1* | 11/2003 | Honary | H04L 41/0896 370/395.4 |
| 2005/0131943 | A1* | 6/2005 | Lewis | G06Q 30/02 |
| 2010/0217860 | A1* | 8/2010 | Naidu | H04L 67/1027 709/224 |
| 2011/0252127 | A1* | 10/2011 | Iyengar | G06F 9/5033 709/224 |
| 2012/0036180 | A1* | 2/2012 | Thornton | H04L 67/1023 709/203 |
| 2015/0189004 | A1* | 7/2015 | Massover | H04L 67/146 709/223 |

\* cited by examiner

*Primary Examiner* — Lashonda Jacobs
(74) *Attorney, Agent, or Firm* — Van Pelt, Yi & James LLP (57) ABSTRACT

Processing a connection request is disclosed. The connection request is received. It is determined whether the connection request identifies a Transport Layer Security (TLS) ticket that identifies a previously load balanced session. In the event it is determined that the TLS ticket identifies the previously load balanced session, (1) the previously load balanced session that corresponds to the connection request is identified, wherein the previously load balanced session is load balanced to a selected server among a plurality of servers, and (2) the connection request is associated with the identified previously load balanced session.

20 Claims, 7 Drawing Sheets

NETWORK DEVICES USING TLS TICKETS FOR SESSION PERSISTENCE

CROSS REFERENCE TO OTHER APPLICATIONS

This application is a continuation of U.S. patent application Ser. No. 14/173,597, now U.S. Pat. No. 9,591,084, entitled NETWORK DEVICES USING TLS TICKETS FOR SESSION PERSISTENCE filed Feb. 5, 2014, which claims priority to U.S. Provisional Patent Application No. 61/904,395 entitled NETWORK DEVICES USING TLS TICKETS FOR SESSION PERSISTENCE filed Nov. 14, 2013 which is incorporated herein by reference for all purposes.

BACKGROUND OF THE INVENTION

Traditionally when utilizing network load balancing, a client requests a service and/or data to a load balancer network device that selects the optimal load balanced server to provide the requested service/data. For example, the load balancer selects a server from one of a plurality of servers that can provide the requested service/data and the request is provided to the selected server. However, subsequent requests from the same client that desires to maintain the same session with the selected server should be provided to the same selected server by the load balancer. For example, the selected server may be maintaining state information for a user session of the client and the subsequent request that relies on the maintained state information should be handled by the selected server even though the load balancer has the ability to direct request to another server. Therefore, there exists a need for an effective way for a load balancer to maintain a communication session.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Load balancing a network session over a Transport Layer Security (TLS) connection is disclosed. In some embodiments, a TLS connection request for a session connection is received. For example, an application of a client requests a network application, network service, and/or remote data and the client requests a connection using the TLS protocol to a load balancer. It is determined whether the TLS connection request is associated with a TLS ticket that identifies a session. For example, it is determined whether the TLS connection request specifies a TLS ticket that identifies a previously established communication between the client application requesting the connection and a load balanced server that has been previously selected for the client application by the load balancer. If it is determined that the TLS connection request is associated with a TLS ticket that identifies a session, a previously load balanced session that corresponds to the TLS connection request is identified. For example, the TLS ticket identifies a server of a previously established communication session with a load balanced server. In another example, an identifier of the TLS ticket is used to locate in a table an identifier of a load balanced server mapped to the identifier of the TLS ticket. The connection request is associated with the identified session. For example, the connection of the connection request is linked to the load balanced server of the identified session.

Figure 1:
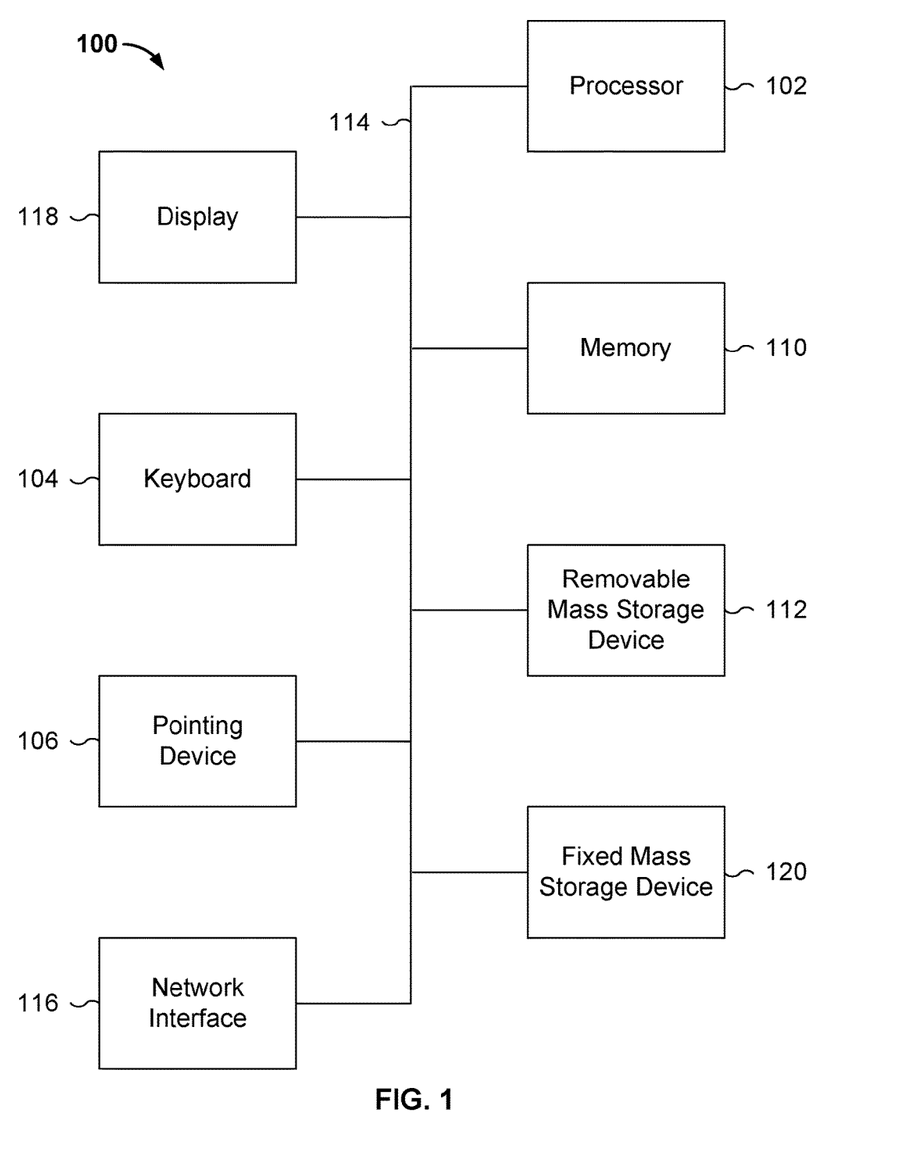
FIG. 1 is a functional diagram illustrating a programmed computer system for performing load balancing in accordance with some embodiments.

FIG. 1 is a functional diagram illustrating a programmed computer system for performing load balancing in accordance with some embodiments. As will be apparent, other computer system architectures and configurations can be used to perform distributed load balancing functions. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, processor 102 controls the reception and manipulation of input data, and the output and display of data on output devices (e.g., display 118). In various embodiments, processor 102 supports standard operating systems as well as virtual machine (VM)-based operating systems. In some embodiments, processor 102 includes and/or is used to implement one or more service engines and/or servers as discussed below, as well as to execute/perform the various processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
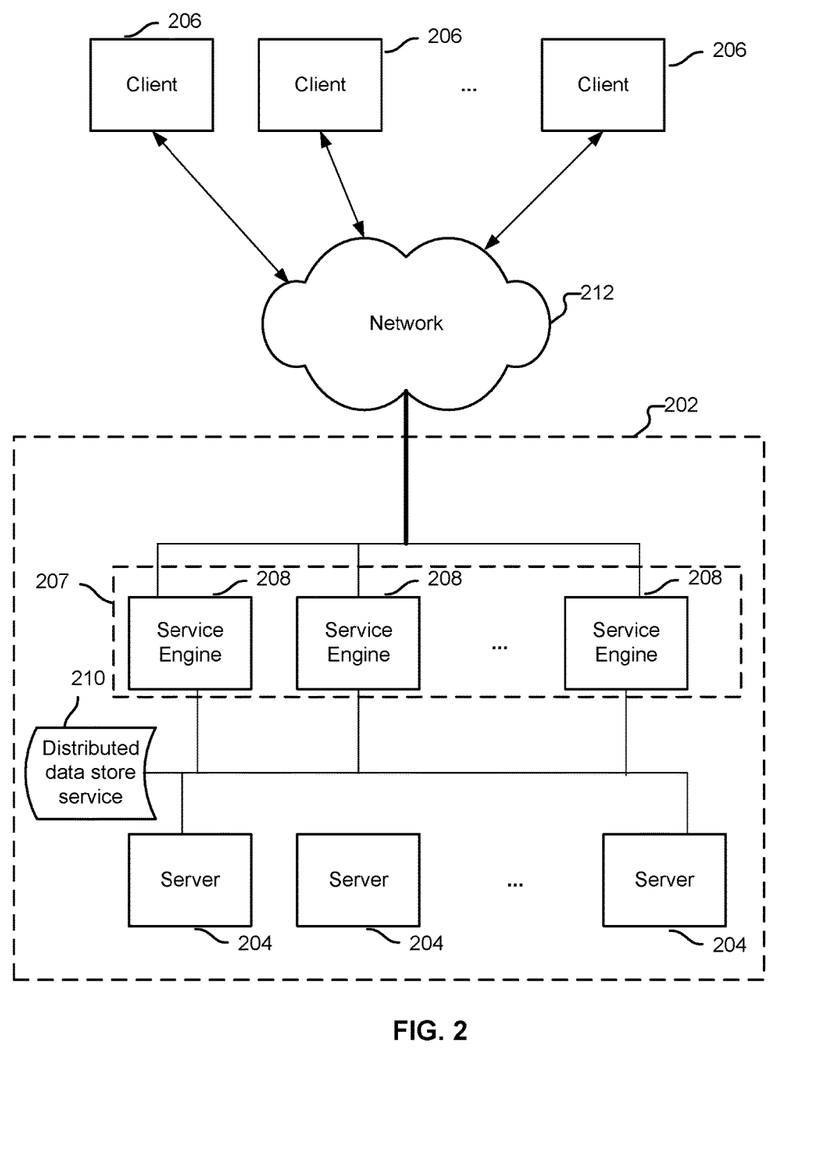
FIG. 2 is a block diagram illustrating an embodiment of a system for load balancing communication sessions.

FIG. 2 is a block diagram illustrating an embodiment of a system for load balancing communication sessions. In the example shown, client devices 206 can be computers, tablets, smartphones, mobile devices, wearable computers, or any other appropriate devices. Platform 202 can be within a data center network or other service provider network. A number of servers 204 are configured to provide network-based applications, services, and/or data to client devices 206. In some embodiments, each server is implemented on a separate physical device. In some embodiments, multiple servers share the same physical device. In the example shown, separate physical devices communicate via communication interfaces such as buses, cables, optical or wireless interfaces and/or a network such as intranets, local area networks (LANs), wide area networks (WANs), radio access networks (RANs), Wi-Fi networks, the Internet, and the like. In some embodiments, the servers operate within standard operating systems (e.g., Linux™, Windows™, etc.) on physical devices; in some embodiments, the servers operate within operating systems on virtual machines (VMs) (e.g., virtual machines supported by a hypervisor).

At least one of clients 206 may request to establish a connection with at least one of servers 204 to gain access to one or more applications, services, and/or data. Depending on the application of the client requesting the server and the protocol used, the connection request can take on a variety of forms. For example, a web browser of the client can fetch a webpage or other resource from a web server; an email client can connect to an email server to send/receive emails; a file sharing client can connect to a file sharing server to share files; a collaboration client can connect to a collaboration server to collaborate on documents, etc.

In the example shown, load balancer 207 includes a plurality of service engines 208. Each service engine may be implemented on a physical device or a virtual machine; multiple service engines may execute on separate physical devices or share the same physical device. Each service engine implements distributed load balancing functions, which can be implemented in software code, in hardware (e.g., using application specific integrated circuits (ASIC)), or a combination. The initial connection request from a client 206 can be received by any service engine 208. To evenly distribute resources, each service engine 208 performs load balancing functions to direct the connection to a selected one of the servers based on a load balancing algorithm. A variety of load balancing algorithms may be implemented. Service engines 208 may cooperate to function as a single load balancer to distribute connections received on network 212 to servers 204. In some embodiments, network 212 connects service engines 208 to servers 204. Network 212 may be any combination of public or private networks, including intranets, local area networks (LANs), wide area networks (WANs), radio access networks (RANs), Wi-Fi networks, the Internet, and the like.

In an alternative example, rather than utilizing a plurality of service engines 208, a single load balancer network component/device is utilized as load balancer 207. For example, there exists a single point of contact where requests for servers 204 are received from clients 206.

A set of related data exchanges between a client and one or more servers may be included in a session. For example, an established communication session may involve a stateful communication between a client and a server where information about a history of the communication is saved and may be relied upon. For example, when a user uses a browser application on a client device to access a secure e-commerce application on a server to purchase a product, the set of secure transaction-related data exchanges is conducted within a Secure Sockets Layer (SSL) or TLS session. While multiple servers can provide the same service to a client, a session is often preferably conducted between one client and one server. In some embodiments, a SSL/TLS session is first established after a set of handshakes between the client and the server. Session information such as IP address and encryption parameters (e.g., session key, master key, etc.) is generated. Establishing the secure session is computationally expensive since the process requires multiple steps of encryption and decryption; thus, for efficiency reasons, the same secure session may be maintained to handle multiple connections from the same client. In other words, if a client first establishes a SSL/TLS session with a website with a first connection request, and shortly thereafter returns to the website with a second connection request, the same secure session is maintained for the first and the second connections.

In order to prevent performing the computationally expensive handshake every time a client desires to communicate with a server, TLS tickets may be utilized. For example, a TLS ticket is created and provided to the client when a new session is established. When the client requests another connection to be a part of the same session, the client provides the TLS ticket that includes the previously established session information, and the server may verify the TLS ticket and resume the secure session identified by the provided TLS ticket without performing the entire handshake process.

When utilizing a load balancer, a request for a resource may be provided by one of a plurality of load balanced servers selected by the load balancer. Depending on the load balancing algorithm, the load balance may select another server to handle a subsequent request. However in some cases, the server handing requests for a particular client/application may be tracking state information related to one or more previous requests and a subsequent request from the same client/application that relies on the tracked state information should be routed to the same server. Thus once a session is established, subsequent data sent by the client for the same session may be desired to be directed by the load balancer to the same server in a persistent manner.

In some embodiments, a client of clients 206 requests a TLS connection to load balancer 207. For example, a TLS connection request is received at one service engine of service engines 208. Load balancer 207 determines whether the request is associated with a TLS ticket that identifies a previously established load balanced session. In some embodiments, a TLS ticket is provided by the client and the TLS ticket includes data identifying an identifier of a server of the previously established session. In some embodiments, an identifier of a TLS ticket may be utilized to search a data structure of the load balancer (e.g., table stored in data store 210) to locate an entry that maps the TLS ticket identifier to a corresponding load balanced session identifier (e.g., identifier of a particular load balanced server). If a corresponding previously established load balanced session is located, the requested connection is associated with the identified session (e.g., the client is connected with identified server).

If a corresponding previously established session cannot be located, a new TLS session is established. In a first embodiment, the load balancer generates and provides to the client a new TLS ticket that identifies the new TLS session and inserts an identifier of the load balanced session (e.g., an identifier of a particular load balanced server selected for the session). In this first embodiment, by extending the TLS ticket to include additional session information, the load balancer is able to provide session persistence by storing state information in the TLS ticket. In a second embodiment, the load balancer forwards the TLS connection request to a selected load balanced server and the selected server provides to the client a TLS ticket that the load balancer intercepts (e.g., proxies) to store in a data structure a mapping between an identifier of the TLS ticket and a corresponding identifier of the load balanced session (e.g., an identifier of a particular load balanced server selected for the session). In this second embodiment, by storing session persistence information in a load balancer data structure rather than modifying the TLS ticket, the load balancer is able to provide session persistence without modifying the TLS ticket (the load balancer might not have the authority or ability to modify the TLS ticket).

In some embodiments, service engines 208 need certain information, referred to as load balancing state information, to synchronize load balancing functions across different service engines. Such load balancing state information should be globally visible to all the service engines and constantly updated. In some cases, the load balancing state information can be used as inputs to certain load balancing algorithms. A few examples of load balancing state information include:

1) Health information of the servers. In some embodiments, a monitoring process periodically checks with the servers to determine whether any of them has failed. The obtained health information is used by the service engines to include healthy servers and exclude failed servers for load balancing purposes.

2) Session information, such as secure socket layer (SSL) or transport layer security (TLS) session information. In some embodiments, an SSL/TLS table that maps a session ID and session parameters is used to maintain SSL/TLS session information.

3) Persistence information. In some embodiments, a data structure includes entries that map an identifier of a TLS ticket along with a corresponding identifier of the session (e.g., an identifier of a particular server selected for the session).

4) Client/server connection information such as the number of connections from a given client, the number of connections being handled by a server, etc.

5) Connection limitation information such as the maximum number of connections a server, a client, or the load balancer as a whole is permitted or capable of handling, etc.

6) Load balancing measurements such as how much load each server has based on number of connections, response time, latency, etc. Many other types of load balancing states are possible.

Many other types of load balancing state information can be used. Depending on implementation, different types of load balancing state information can be stored in different data stores/data structures or a unified data store/data structure.

In the example shown, a distributed data store service 210 is used to synchronize load balancing state information across service engines 208, facilitate cooperation among the service engines, and/or store session persistence information (e.g., TLS ticket table). In some embodiments, distributed data store service 210 supports an atomic read-miss-create (RMC) function. In various embodiments, distributed data store service 210 is implemented using one or more databases, a distributed protocol, and/or other appropriate techniques. In some embodiments, distributed data store service 210 supplies a set of application programming interfaces (APIs) so that the same services (functions) are provided to the service engines regardless of the underlying mechanisms used to implement the service.

Figure 3:
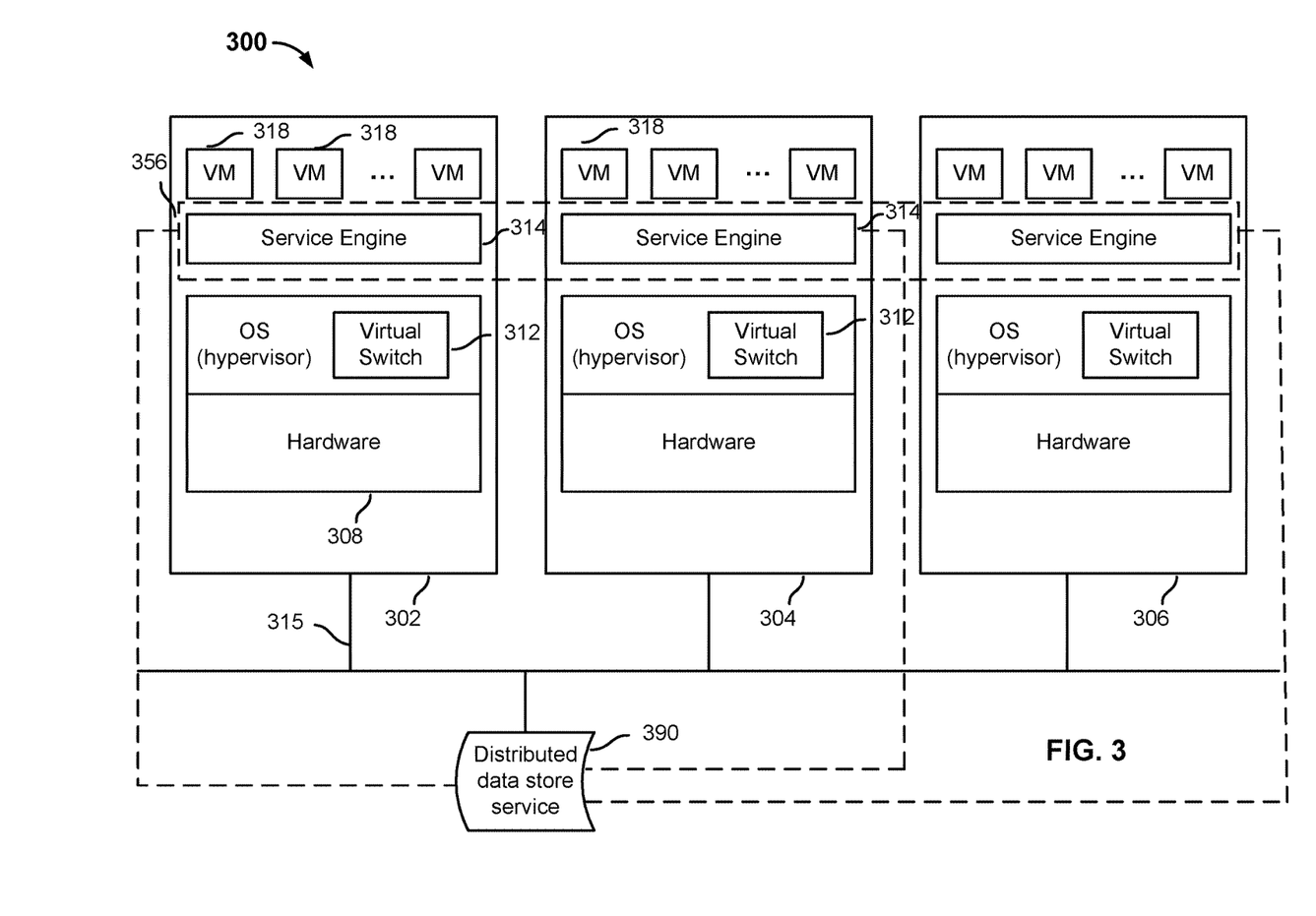
FIG. 3 is a block diagram illustrating an embodiment of a virtualized distributed load balancer.

FIG. 3 is a block diagram illustrating an embodiment of a virtualized distributed load balancer. One or more components of FIG. 3 may be included in load balancer 207 and/or service engines 208 of FIG. 2. In this example, platform 300 includes a number of devices (e.g., multiple server computers or a multicore server comprising multiple processing cores). A physical device (e.g., 302, 304, 306, etc.) has hardware components and software components, and may be implemented using a device such as 100. In particular, hardware of the device supports operating system software in which a number of virtual machines (VMs) 318 are configured to execute. A VM is a software implementation of a machine (e.g., a computer) that simulates the way a physical machine executes programs. The part of the device's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In this example, clients (not shown) communicate with servers, which are configured as VMs executing instances of network applications. Examples of such network applications include web applications such as web applications, shopping cart, user authentication, credit card authentication, email, file sharing, virtual desktops, voice/video streaming, online collaboration, etc. Many other network applications can be implemented. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. A network service layer providing load balancing functions is described in detail below. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch 312. A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines 314 are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. In some embodiments, a load balancer component is executed within a service engine to provide load balancing logic, specifically to distribute traffic load amongst instances of target applications executing on the local physical device as well as other physical devices. In some embodiments, other types of service components such as a firewall may be implemented and enabled as appropriate. When a specific service is desired, a corresponding service component is configured and invoked by the service engine to execute in a VM. A distributed load balancer comprising multiple load balancer components is described in detail below.

A virtual switch such as 312 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). In some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application executes. In some embodiments, a service engine sends data to and receives data from a target application via the virtual switch.

In some embodiments, a controller (not shown) is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof.

In the example shown, a distributed data store service 390 is used to store data and facilitate the synchronization of load balancing state information across service engines. The service engines and the distributed data store service cooperate to function as a single entity, forming a distributed network service layer 356 to provide services to the target applications. In other words, although multiple service engines 314 are installed and running on multiple physical devices, they cooperate to act as a single layer 356 across these physical devices. In some embodiments, the service engines cooperate by sharing state information (e.g., load balancing state information) using distributed data store service 390.

In some embodiments, a single service layer is presented to the target applications to provide the target applications with services. The interaction between the target applications and service layer is transparent in some cases. In this example, a load balancing service is provided by the service layer, and the target application sends and receives data via existing APIs as it would with a standard, non-distributed load balancing device. In other words, from the perspective of a client or a server-side application targeted by the client, it is as if a single service layer object (specifically, a single load balancer) were instantiated and with which the client or target application communicated, even though in some implementations multiple service engine objects (with multiple load balancing components) execute on multiple devices.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine (in particular the load balancing component within the service engine) performs load balancing functions. Specifically, based on load balancing factors such as configured rules and operating conditions, the service engine redirects the traffic to an appropriate target application executing in a VM on a server.

Figure 4:
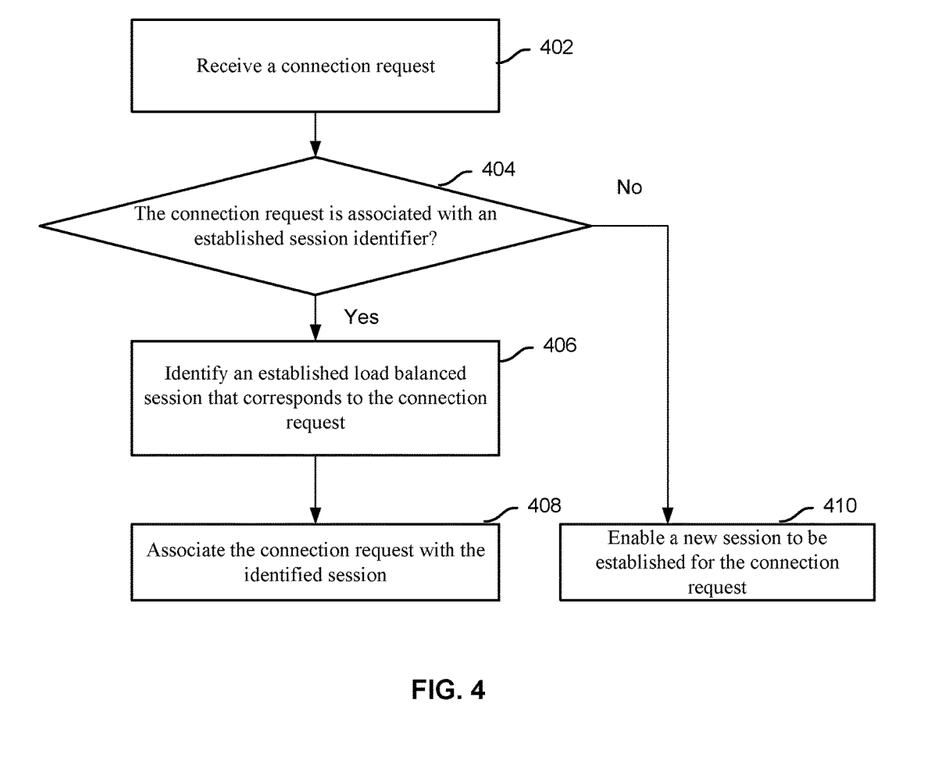
FIG. 4 is a flowchart illustrating an embodiment of a process for processing a connection request.

FIG. 4 is a flowchart illustrating an embodiment of a process for processing a connection request. The process of FIG. 4 may be implemented on a load balancer. In some embodiments, the process of FIG. 4 is implemented on one or more of service engines 208, load balancer 207 and service engines 314 of FIGS. 2 and 3.

At 402, a connection request is received. The connection request is received from a client. For example, an application (e.g., web browser) of a client such as client 206 of FIG. 2 sends via client 206 and the Internet to a load balancer network device a request to initiate a connection to a server that is to provide an application, service, and/or content. In various examples, a web browser client can fetch a webpage or other resource from a web server; an email client can connect to an email server to send/receive emails; a file sharing client can connect to a file sharing server to share files; a collaboration client can connect to a collaboration server to collaborate on documents, etc. In some embodiments, the connection request is a request made using a cryptographic protocol. For example, the connection request is a TLS connection request.

At 404, it is determined whether the connection request is associated with an established session identifier. For example, it is determined whether session persistence is to be maintained with respect to a previously established load balanced communication session. Session persistence may be desired to avoid consuming resources required to establish a new session, rely on state information of an existing session, and/or localize processing of a particular client/application to a particular server.

In some embodiments, determining whether the connection request is associated with a session identifier includes determining whether the connection request identifies a previously established session and/or connection. For example, it is determined whether the connection request identifies a TLS ticket. If the connection request does not identify a TLS ticket (or other previously established session/connection identifier) or identifies that the connection request is to establish a new session, it is determined that the connection request is not associated with an existing session identifier. If the connection request identifies a TLS ticket (or other previously established session/connection identifier), it is determined whether the identified TLS ticket (or other previously established session/connection identifier) is valid and identifies a valid established session. The TLS ticket may be included in the contents of a connection request and/or a location identifier of where the TLS ticket is to be obtained may be provided.

In some embodiments, validating the TLS ticket includes validating the TLS ticket for authenticity. For example an encrypted TLS ticket is decrypted using an encryption key to verify its authenticity. The TLS ticket may be analyzed to determine whether tampering has occurred with the TLS ticket. In some embodiments, validating the TLS ticket includes utilizing an identifier of the TLS ticket to locate an entry in a data structure (e.g., stored by a load balancer and/or a remote storage such as storage 210 of FIG. 2) that verifies the TLS ticket. For example, a load balancer maintains a data structure (e.g., list, table, hash table, database, etc.) containing entries that map an identifier (e.g., unique ticket identifier) of a TLS ticket to a corresponding identifier of an established load balanced session and it is determined whether an entry matching the TLS ticket to be validated is included in the data structure.

In some embodiments, validating the TLS ticket includes determining whether the TLS ticket has expired. For example, it is determined whether a timer included in the TLS ticket has expired. If the TLS ticket has expired, the process may proceed to step 410.

If at 404 it is determined that the connection request is associated with a session identifier, at 406 an established load balanced session that corresponds to the connection request is identified. In some embodiments, determining existing sessions includes obtaining from the TLS ticket of the connection request a stored identifier of the established load balanced session. The stored identifier was placed in the TLS ticket when the TLS ticket was created for the established load balanced session and the identifier is read from the TLS ticket to identify the session to be associated with the connection request. The identifier of the established load balanced session may be a unique identifier of the session to be resumed using the TLS ticket and/or an identifier (e.g., location address) of a load balanced server to be selected by a load balancer to handle communication of the connection request.

In some embodiments, determining established load balanced sessions includes utilizing an identifier of the TLS ticket to locate an entry in a data structure (e.g., stored by a load balancer and/or a storage such as storage 210 of FIG. 2) that maps the TLS ticket with a load balanced session identifier. For example, a load balancer maintains a data structure (e.g., list, table, hash table, database, etc.) containing entries that map an identifier (e.g., unique ticket identifier that may be included in the ticket or generated using the ticket) of a TLS ticket to a corresponding identifier of an established load balanced session and an entry matching the TLS ticket of the connection request is located. The load balanced session identifier of the matching entry may be a unique identifier of the session to be resumed using the TLS ticket and/or an identifier (e.g., location address) of a load balanced server to be selected by a load balancer to handle communication of the connection request. In some embodiments, if the established session cannot be identified, an error message may be provided and/or the process may proceed to 410.

At 408, the connection request is associated with the identified session. In some embodiments, the connection request is forwarded/proxied to a load balanced server handling the established session. For example, the connection request along with its TLS ticket is provided to the load balanced server and the server reestablishes a TLS connection using the TLS ticket (e.g., avoiding the full TLS handshake) and resumes the session. In some embodiments, communication received via the connection request is forwarded/proxied to a load balanced server handling the established session. For example, the load balancer that initially received the connection request reestablishes a TLS connection using the TLS ticket (e.g., avoiding the full TLS handshake) with the requesting client and communication received for the load balanced server via the reestablished connection is proxied to the load balanced server.

If at 404 it is determined that the connection request is not associated with a session identifier, at 410 a new session is enabled to be established for the connection request. In some embodiments, the new session is established by the load balanced server that initially received the connection request. For example, the load balanced server participates in a TLS handshake with the requesting client to establish a TLS connection/session, selects a load balanced server to handle the content requests of the established session, and provides to the client a TLS ticket with an inserted identifier of the established load balanced session. In some embodiments, the load balancer forwards the connection request to a selected load balanced server and the selected server participates in a TLS handshake with the requesting client and provides to the client a TLS ticket that the load balancer intercepts (e.g., proxies) to store in a data structure an identifier of the TLS ticket along with a corresponding identifier of the load balanced session (e.g., an identifier of the particular load balanced server selected for the session).

Figure 5:
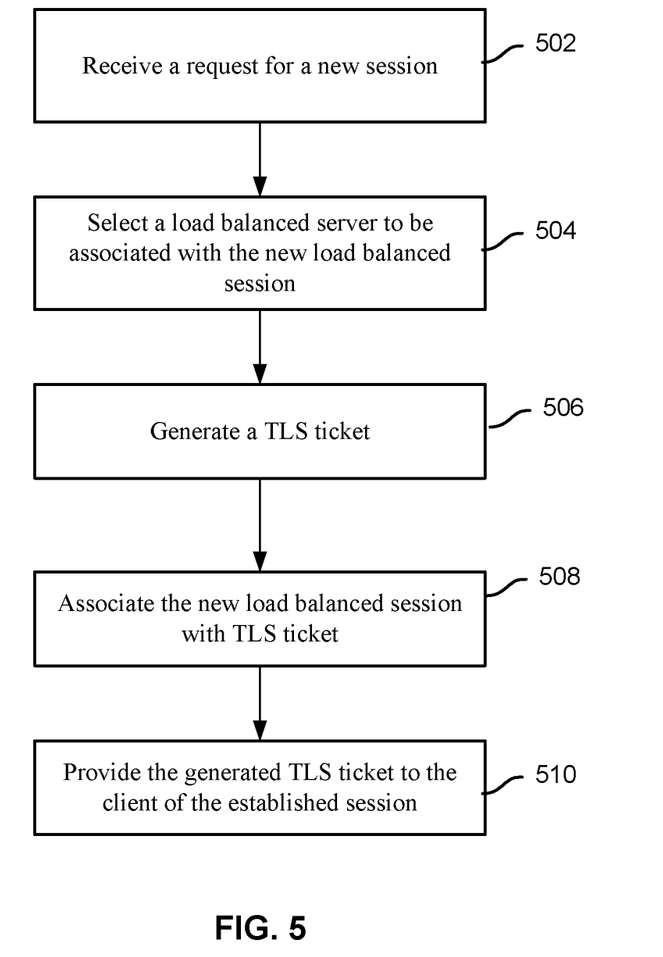
FIG. 5 is a flowchart illustrating an embodiment of a process for generating a TLS ticket.

FIG. 5 is a flowchart illustrating an embodiment of a process for generating a TLS ticket. The process of FIG. 5 may be implemented in a load balancer. In some embodiments, the process of FIG. 5 is implemented on one or more of service engines 208, load balancer 207, and service engines 314 of FIGS. 2 and 3. In some embodiments, at least a portion of the process of FIG. 5 is included in step 410 of FIG. 4.

At 502, a request for a new session is received. In some embodiments, the request is the request received in 402 and/or a result of a decision made in 404 of FIG. 4. For example, a request for a new session is received because it was determined in 404 that a received connection request is not associated with a previously established session identifier.

At 504, a load balanced server to be associated with the new load balanced session is selected. In some embodiments, a selected server is selected among a plurality of load balanced servers load balanced by a load balancer. In some embodiments, the selected server is selected using a load balancing algorithm employed by the load balancing component of the service engine/load balancer. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms can be used. In some embodiments, one or more servers eligible to be able to be selected as the selected server are selected based at least in part on one or more of the following, a client requesting the session, an application of a client requesting the session, a type of content requested, and/or status of load balanced servers. For example, not every server load balanced by the load balancer is able to provide a content to be requested using the new session, and a set of load balanced servers eligible to be selected is determined before one of the eligible servers is selected using a load balancing algorithm. In some embodiments, a plurality of load balanced servers is selected to be associated with the new load balanced session.

At 506, a TLS ticket is generated. In some embodiments, generating the TLS ticket includes participating in a TLS connection negotiation with a requesting client to establish a TLS session with the client. In some embodiments, the TLS ticket includes a ticket identifier, one or more encryption keys, and state information of the established TLS session.

At 508, the new load balanced session is associated with the TLS ticket. In some embodiments, the selected load balanced server is associated with the TLS ticket. For example, an identifier (e.g., network location address) of the selected load balanced server is included (e.g., stored) in the TLS ticket (e.g., as an extension of the TLS ticket). In some embodiments, a plurality of load balanced servers is associated with the TLS ticket. The generated TLS ticket may be encrypted.

At 510, the generated TLS ticket is provided to the client of the established session. The TLS ticket may be used by the client to resume the session at a later time. In some embodiments, the TLS ticket includes a time value that indicates a length of time the TLS ticket is valid. The time value may be renewed periodically and/or dynamically. In some embodiments, this time value is utilized to track a length of time the load balanced session associated with the TLS ticket is valid. For example, as long as the load balanced session identified by the TLS ticket is to remain valid, the timer value is periodically and/or dynamically updated. The load balanced session may be terminated by modifying the time value or letting the time value expire without an update.

Figure 6:
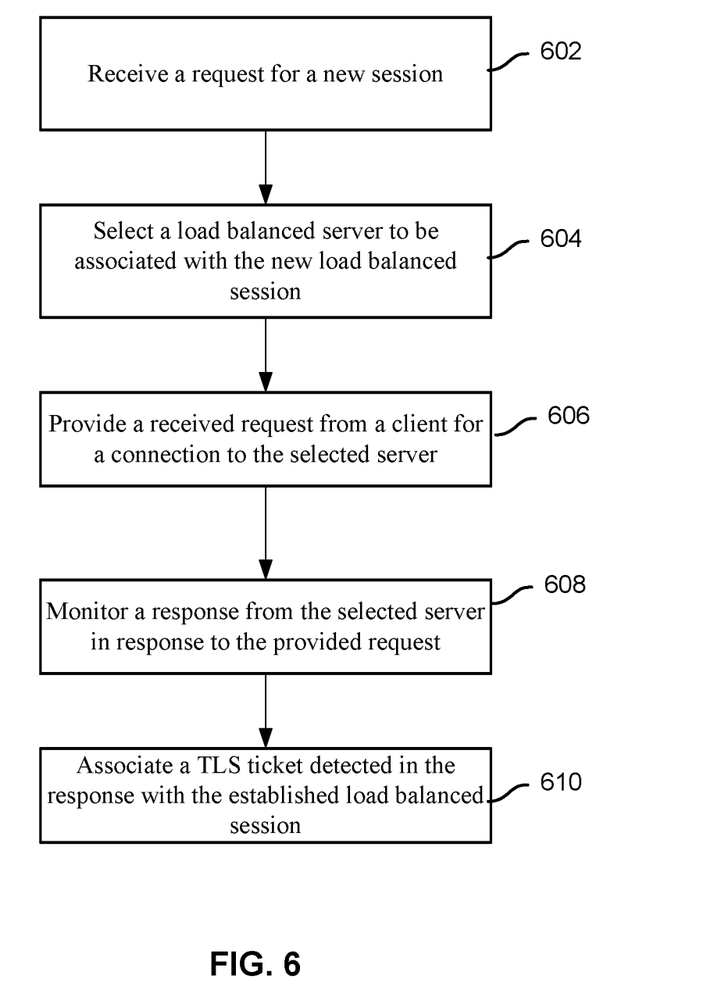
FIG. 6 is a flowchart illustrating an embodiment of a process for mapping a TLS ticket to a load balanced session.

FIG. 6 is a flowchart illustrating an embodiment of a process for mapping a TLS ticket to a load balanced session. The process of FIG. 6 may be implemented in a load balancer. In some embodiments, the process of FIG. 6 is implemented on one or more of service engines 208, load balancer 207, and service engines 314 of FIGS. 2 and 3. In some embodiments, at least a portion of the process of FIG. 6 is included in step 410 of FIG. 4.

At 602, a request for a new session is received. In some embodiments, the request is the request received in 402 and/or a result of a decision made in 404 of FIG. 4. For example, a request for a new session is received because it was determined in 404 that a received connection request is not associated with a previously established session identifier.

At 604, a load balanced server to be associated with the new load balanced session is selected. In some embodiments, a selected server is selected among a plurality of load balanced servers load balanced by a load balancer. In some embodiments, the selected server is selected using a load balancing algorithm employed by the load balancing component of the service engine/load balancer. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms can be used. In some embodiments, one or more servers eligible to be able to be selected as the selected server are selected based at least in part on one or more of the following: a client requesting the session, an application of a client requesting the session, a type of content requested, and/or status of load balanced servers. For example, not every server load balanced by the load balancer is able to provide a content to be requested using the new session, and a set of load balanced servers eligible to be selected is determined before one of the eligible servers is selected using a load balancing algorithm. In some embodiments, a plurality of load balanced servers is selected to be associated with the new load balanced session.

At 606, a received request from a client for a connection is provided to the selected server. In some embodiments, the received request is associated with the request received in 402 of FIG. 4. The selected server receives the request and the selected server participates in a TLS handshake with the requesting client of the connection request to establish a new TLS session. The selected server then provides a TLS ticket to the selected server. In some embodiments, the TLS ticket includes a ticket identifier, one or more encryption keys, and state information of the established TLS session.

At 608, a response from the selected server in response to the provided request is monitored. For example, a load balancer monitors communication from the selected server to detect the TLS ticket of the newly established TLS session. In some embodiment, the load balancer acts as a proxy between the client and the selected server. In some embodiments, the selected server provides a copy of the provided response (e.g., with the TLS ticket) to the load balancer.

At 610, a TLS ticket detected in the response is associated with the established load balanced session. In some embodiments, a load balancer maintains a data structure (e.g., list, table, hash table, database, etc.) containing entries that map an identifier (e.g., unique TLS ticket identifier) of a TLS ticket to a corresponding identifier of the load balanced session (e.g., unique session identifier, identifier of the selected server of the associated TLS session, etc.). For example, an identifier of the TLS ticket and an associated identifier of the selected server (e.g., network address of the selected server) is added to the data structure. The data structure may be stored in the load balancer network device and/or at a networked storage such as storage 210 of FIG. 2. When the established session expires (e.g., TLS ticket validity time value stored in the ticket expires) and/or the session is closed, the corresponding entry in the data structure may be expired/deleted.

In some embodiments, the TLS ticket includes a time value that indicates a length of time the TLS ticket is valid. The time value may be renewed periodically and/or dynamically. In some embodiments, this time value is utilized to track a length of time the load balanced session associated with the TLS ticket is valid. For example, as long as the load balanced session identified by the TLS ticket is to remain valid, the timer value is periodically and/or dynamically updated. The load balanced session may be terminated by modifying the time value or letting the time value expire without an update.

Figure 7:
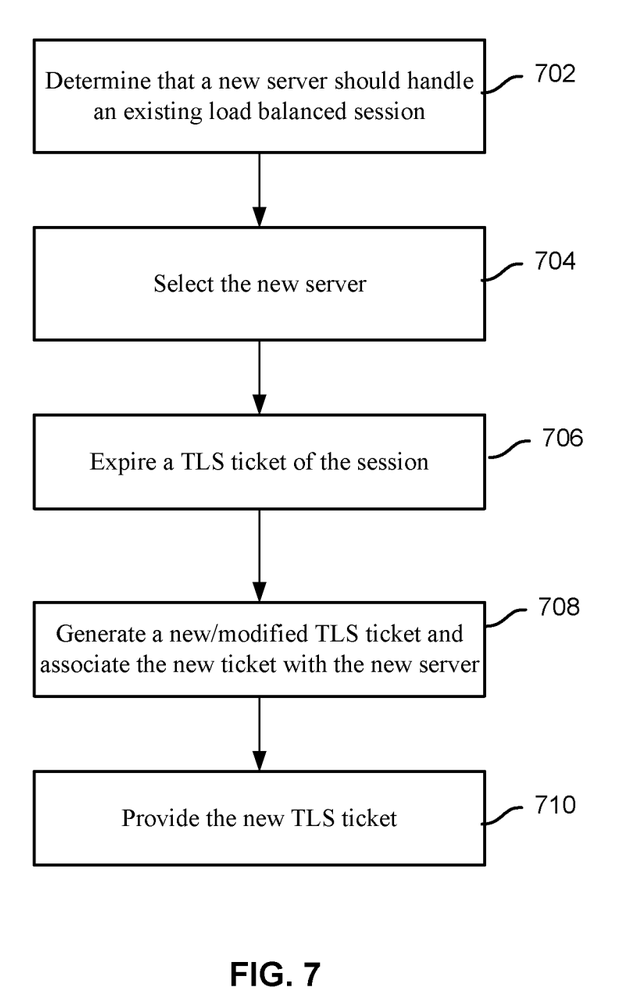
FIG. 7 is a flowchart illustrating an embodiment of a process for selecting a new load balanced server.

FIG. 7 is a flowchart illustrating an embodiment of a process for selecting a new load balanced server. The process of FIG. 7 may be implemented in a load balancer. In some embodiments, the process of FIG. 7 is implemented on one or more of service engines 208, load balancer 207, and service engines 314 of FIGS. 2 and 3.

At 702, it is determined that a new server should handle an existing load balanced session. For example, the previously selected server of the session may be offline due to an error. In another example, a load balancer may determine that another server would be more optimal for the session.

At 704, the new server is selected. In some embodiments, the new server is selected using a load balancing algorithm employed by the load balancing component of the service engine/load balancer. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms can be used. In some embodiments, one or more servers eligible to be able to be selected as the new server are selected based at least in part on one or more of the following: a client requesting the session, an application of a client requesting the session, a type of content requested, and/or status of load balanced servers. For example, not every server load balanced by the load balancer is able to provide a content served by the session, and a set of load balanced servers eligible to be selected is determined before one of the eligible servers is selected using a load balancing algorithm. In some embodiments, a plurality of load balanced servers is selected.

At 706, a TLS ticket of the session is expired. In some embodiments, expiring the TLS ticket includes allowing a time value of the TLS ticket to elapse without renewing the time value or modifying the timer as expired. In some embodiments, expiring the TLS ticket includes requesting to the client to renegotiate the TLS ticket.

At 708, a new/modified TLS ticket is generated and the new ticket is associated with the new server. In some embodiments, the new/modified TLS ticket includes an identifier of the new server. In some embodiments, a data structure (e.g., data structure discussed in conjunction with 610 of FIG. 6) includes a new and/or modified entry that associates an identifier of the new TLS ticket with an identifier of the new selected load balanced server.

At 710, the new TLS ticket is provided. For example, the new TLS ticket is provided to the client of the session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a connection request, comprising:
receiving the connection request;
determining whether the connection request identifies a Transport Layer Security (TLS) ticket that identifies a previously load balanced session; and
in the event it is determined that the TLS ticket identifies the previously load balanced session:
(1) identifying the previously load balanced session that corresponds to the connection request, wherein the previously load balanced session is load balanced to a selected server among a plurality of servers and identifying the previously load balanced session that corresponds to the connection request includes utilizing an identifier of the TLS ticket to identify a mapping between the TLS ticket to an identifier of the selected server, wherein identifying the mapping includes identifying the mapping among a plurality of different mappings, and each of the plurality of different mappings maps a different TLS ticket identifier to one of the plurality of servers, and
(2) associating the connection request with the identified previously load balanced session.

2. The method of claim 1, wherein the method is at least in part implemented on a network load balancer.

3. The method of claim 1, wherein the method is at least in part implemented on at least one of a plurality of service engines of a network load balancer.

4. The method of claim 1, wherein the method is least in part implemented on a virtual machine.

5. The method of claim 1, wherein determining whether the connection request identifies the TLS ticket includes determining whether session persistence is to be maintained with respect to the connection request.

6. The method of claim 1, wherein determining whether the connection request identifies the TLS ticket includes determining whether the TLS ticket is authentic.

7. The method of claim 1, wherein determining whether the connection request identifies the TLS ticket includes determining whether the TLS ticket has expired.

8. The method of claim 1, wherein identifying the previously load balanced session that corresponds to the connection request includes obtaining from the TLS ticket a stored identifier of the selected server.

9. The method of claim 1, wherein associating the connection request with the identified previously load balanced session includes assigning the selected server to the connection request.

10. The method of claim 1, further comprising in the event it is determined that the TLS ticket does not identify the previously load balanced session, enabling a new load balanced session to be established for the connection request.

11. The method of claim 10, wherein enabling the new load balanced session to be established includes performing a TLS protocol handshake with a sender of the connection request.

12. The method of claim 10, wherein enabling the new load balanced session to be established includes selecting a load balancer determined server among the plurality of servers and providing to a sender of the connection request a generated TLS ticket that includes an identifier of the load balancer determined server.

13. The method of claim 10, wherein enabling the new load balanced session to be established includes selecting a load balancer determined server among the plurality of servers and providing the connection request to the load balancer determined server.

14. The method of claim 13, wherein a response provided in response to the provided connection request is monitored.

15. The method of claim 14, wherein when the response that includes a detected TLS ticket is detected, an entry mapping an identifier of the detected TLS ticket to an identifier of the selected load balanced server is stored in a data structure.

16. The method of claim 1, further comprising, in the event it is determined that a new server should be assigned to the previously load balanced session, allowing the TLS ticket to expire.

17. The method of claim 1, further comprising in the event it is determined that a new server should be assigned to the previously load balanced session, requesting renegotiation of the TLS ticket.

18. A system for processing a connection request, comprising:
a communication interface configured to receive the connection request; and
a processor coupled with the communication interface and configured to:
determine whether the connection request identifies a Transport Layer Security (TLS) ticket that identifies a previously load balanced session; and
in the event it is determined that the TLS ticket identifies the previously load balanced session:
(1) identify the previously load balanced session that corresponds to the connection request, wherein the previously load balanced session is load balanced to a selected server among a plurality of servers and identifying the previously load balanced session that corresponds to the connection request includes utilizing an identifier of the TLS ticket to identify a mapping between the TLS ticket to an identifier of the selected server, wherein identifying the mapping includes identifying the mapping among a plurality of different mappings, and each of the plurality of different mappings maps a different TLS ticket identifier to one of the plurality of servers, and
(2) associate the connection request with the identified previously load balanced session.

19. The system of claim 18, wherein the processor is further configured to, in the event it is determined that a new server should be assigned to the previously load balanced session, allow the TLS ticket to expire.

20. A computer program product for processing a connection request, the computer program product being embodied in a non-transitory computer readable storage medium and comprising computer instructions for:
receiving the connection request;

determining whether the connection request identifies a Transport Layer Security (TLS) ticket that identifies a previously load balanced session; and in the event it is determined that the TLS ticket identifies the previously load balanced session:
(1) identifying the previously load balanced session that corresponds to the connection request, wherein the previously load balanced session is load balanced to a selected server among a plurality of servers and identifying the previously load balanced session that corresponds to the connection request includes utilizing an identifier of the TLS ticket to identify a mapping between the TLS ticket to an identifier of the selected server, wherein identifying the mapping includes identifying the mapping among a plurality of different mappings, and each of the plurality of different mappings maps a different TLS ticket identifier to one of the plurality of servers, and
(2) associating the connection request with the identified previously load balanced session.

* * * * *